US012707520B2

(12) United States Patent
Maemoto et al.

(10) Patent No.: US 12,707,520 B2
(45) Date of Patent: Aug. 11, 2026

(54) MASTER NODE, COMMUNICATION CONTROL METHOD, AND COMMUNICATION APPARATUS

(71) Applicants: DENSO CORPORATION, Kariya-city (JP); TOYOTA JIDOSHA KABUSHIKI KAISHA, Toyota (JP)

(72) Inventors: Daiki Maemoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

(*) Notice: Subject to any disclaimer, the term of this patent is extended or adjusted under 35 U.S.C. 154(b) by 293 days.

(21) Appl. No.: 18/396,604

(22) Filed: Dec. 26, 2023

(65) Prior Publication Data

US 2024/0129979 A1 Apr. 18, 2024

Related U.S. Application Data

(63) Continuation of application No. PCT/JP2022/025657, filed on Jun. 28, 2022.

(30) Foreign Application Priority Data

Jun. 29, 2021 (JP) ................................ 2021-107721

(51) Int. Cl.
*H04W 76/15* (2018.01)
*H04W 28/12* (2009.01)
(Continued)

(52) U.S. Cl.
CPC .......... *H04W 76/15* (2018.02); *H04W 28/12* (2013.01); *H04W 76/20* (2018.02); *H04W 80/02* (2013.01)

(58) Field of Classification Search
CPC ..... H04W 80/02; H04W 76/27; H04W 72/23; H04W 76/15; H04W 24/10; H04W 76/19; H04L 5/0053
See application file for complete search history.

(56) References Cited

U.S. PATENT DOCUMENTS 12,069,757 B2 8/2024 Mochizuki et al.
2020/0120569 A1 4/2020 Baek et al.
(Continued)

FOREIGN PATENT DOCUMENTS

EP 3606134 B1 * 3/2021 ............ H04W 76/19
WO 2019031490 A1 2/2019
(Continued)

OTHER PUBLICATIONS

R2-2106023—Efficient SCG (de)activation, 3GPP TSG-RAN WG2 #114-e, Electronic meeting, May 19-27, 2021, pp. 1-10.
(Continued)

*Primary Examiner* — Khalid W Shaheed
(74) *Attorney, Agent, or Firm* — Harness, Dickey & Pierce, P.L.C.

(57) ABSTRACT

A master node is connected to a communication apparatus together with a secondary node using dual connectivity. The master node comprises a controller having a packet data convergence protocol (PDCP) entity and a first radio link control (RLC) entity, the PDCP entity outputting a PDCP protocol data unit (PDU) to the first RLC entity and outputting a duplication of the PDCP PDU to a second RLC entity of the secondary node. The PDCP entity deactivates the duplication of the PDCU PDU for the second RLC entity in a case where a secondary cell group associated with the secondary node is deactivated.

3 Claims, 9 Drawing Sheets

(51) Int. Cl.
*H04W 76/20* (2018.01)
*H04W 80/02* (2009.01)

(56) References Cited

U.S. PATENT DOCUMENTS

2020/0170072 A1 5/2020 Xiao et al.
2021/0345173 A1 11/2021 Uchino et al.

FOREIGN PATENT DOCUMENTS

WO 2020090072 A1 5/2020
WO WO-2021155947 A1 * 8/2021 ............ H04W 40/02
WO WO-2022030579 A1 * 2/2022 ............ H04W 76/20

OTHER PUBLICATIONS

R2-2105829, UE behaviour in deactivated SCG, 3GPP TSG-RAN WG2 Meeting #114-e, Online, May 19-27, 2021, pp. 1-4.
R2-2105064_Mobility for deactivated SCG, 3GPP TSG-RAN WG2 #114-e, Electronic meeting, May 19-27, 2021, pp. 1-4.
R2-2103808—UE measurements and reporting in deactivated SCG, 3GPP TSG-RAN WG2 #113bis-e, Electronic meeting, Apr. 12, 2021-Apr. 20, 2021, pp. 1-10.
R2-2103893, Qualcomm Incorporated, UE measurements and reporting in deactivated SCG, 3GPP TSG-RAN WG2 Meeting #113-bis-e, Online, Apr 12-Apr. 20, 2021, pp. 1-9.
R2-2103807—SCG deactivation procedures, 3GPP TSG-RAN WG2 #113bis-e, Electronic meeting, Apr. 12-20, 2021, pp. 1-10.
R2-2104316-Summary of AI 8.2.2.2: UE measurements and reporting in deactivated SCG, 3GPP TSG-RAN WG2 Meeting #113 bis electronic, Online, Apr. 12-Apr. 20, 2021, pp. 1-7.
R2-2103979, Huawei, HiSilicon, SCG activation, 3GPP TSG-RAN WG2 Meeting #113b-e, Online, Apr. 12-Apr. 20, 2021, pp. 1-6.
R2-2103977, Huawei, HiSilicon, SCG deactivation, 3GPP TSG-RAN WG2 Meeting #113bis-e, Online, Apr. 4-12, 2021, pp. 1-2.
R2-2104315, Huawei, HiSilicon, Summary of AI 8.2.2.1: Deactivation of SCG, 3GPP TSG-RAN WG2 Meeting #113bis-e, Online, Apr. 4-12, 2021, pp. 1-5.
RP-201040, Revised WID on Further Multi-RAT Dual-Connectivity enhancements, 3GPP TSG RAN Meeting #88e, Electronic Meeting, Jun. 29-Jul. 3, 2020, pp. 1-4.
3GPP TS 38.331 V16.0.0, (Mar. 2020), 3rd Generation Partnership Project; Technical Specification Group Radio Access Network; NR; Radio Resource Control (RRC) protocol specification (Release 16), pp. 1-835.
3GPP TS 38.323 V16.0.0 (Mar. 2020), 3rd Generation Partnership Project; Technical Specification Group Radio Access Network; NR; Packet Data Convergence Protocol (PDCP) specification (Release 16), pp. 1-37.
3GPP TS 38.321 V16.0.0, (Mar. 2020), 3rd Generation Partnership Project; Technical Specification Group Radio Access Network; NR; Medium Access Control (MAC) protocol specification (Release 16), pp. 1-141.
3GPP TS 38.300 V16.0.0, (Dec. 2019), 3rd Generation Partnership Project; Technical Specification Group Radio Access Network; NR; NR and NG-RAN Overall Description; Stage 2 (Release 16), pp. 1-101.
3GPP TS 38.213 V16.0.0, (Dec. 2019), 3rd Generation Partnership Project; Technical Specification Group Radio Access Network; NR; Physical layer procedures for control (Release 16), pp. 1-146.
3GPP TS 38.133 V16.0.0_cover, (Jun. 2019), 3rd Generation Partnership Project; Technical Specification Group Radio Access Network; NR; Requirements for support of radio resource management (Release 16), pp. 1-16.
3GPP TS 38.133 V16.0.0_s0-11, (Jun. 2019), pp. 1-170.
3GPP TS 38.133 V16.0.0_sA.1-A.5, (Jun. 2019), Annex A (normative): Test Cases, Purpose of annex, pp. 1-375.
3GPP TS 38.133 V16.0.0_sA.6-A.8, (Jun. 2019), NR standalone tests with all NR cells in FR1, pp. 1-423.
3GPP TS 38.133 V16.0.0-sB.1-XX, (Jun. 2019), Annex B (normative): Conditions for RRM requirements applicability for operating bands, Conditions for NR RRC_IDLE state mobility, pp. 1-15.
3GPP TS 37.340 V16.5.0, (Mar. 2021), 3rd Generation Partnership Project; Technical Specification Group Radio Access Network; Evolved Universal Terrestrial Radio Access (E-UTRA) and NR; Multi-connectivity; Stage 2 (Release 16), pp. 1-84.
R2-2204621, Qualcomm Incorporated, 3GPP TSG-RAN WG2 Meeting #118-e, Online, May 9-May 20, 2022, pp. 1-9.
3GPP RAN WG2 Meeting #114-e, R2-2105797, "Activation and Deactivation of SCG," InterDigital Inc., May 17-29, 2021.
3GPP TSG-RAN WG2 #114-e, R2-2106336, "UE behavior for SCG deactivation," MediaTek Inc., dated May 19-27, 2021.
3GPP TSG-RAN WG2 Meeting #114 electronic, R2-2106287, "Discussion for UE behaviour in deactivated SCG," Sharp, dated May 19-27, 2021.

* cited by examiner

FIG. 2

100
UE
NAS
RRC
PDCP
RLC
MAC
PHY

200
BASE STATION
RRC
PDCP
RLC
MAC
PHY

300
CORE NETWORK APPARATUS
NAS

FIG. 3

200
BASE STATION
SDAP
PDCP
RLC
MAC
PHY

100
UE
SDAP
PDCP
RLC
MAC
PHY

FIG. 8

.1.3 Packet Duplication

When duplication is configured for a radio bearer by RRC, at least one secondary RLC entity is added to the radio bearer to handle the duplicated PDCP PDUs as depicted on Figure 16.1.3-1, where the logical channel corresponding to the primary RLC entity is referred to as *the primary logical channel*, and the logical channel corresponding to the secondary RLC entity(ies), the *secondary logical channel(s)*. All RLC entities have the same RLC mode. Duplication at PDCP therefore consists in submitting the same PDCP PDUs multiple times: once to each activated RLC entity for the radio bearer. With multiple independent transmission paths, packet duplication therefore increases reliability and reduces latency and is especially beneficial for URLLC services.

NOTE: PDCP control PDUs are not duplicated and always submitted to the primary RLC entity.

When configuring duplication for a DRB, RRC also sets the state of PDCP duplication (either activated or deactivated) at the time of (re-)configuration. After the configuration, the PDCP duplication state can then be dynamically controlled by means of a MAC control element and in DC, the UE applies the MAC CE commands regardless of their origin (MCG or SCG). When duplication is configured for an SRB the state is always active and cannot be dynamically controlled. When configuring duplication for a DRB with more than one secondary RLC entity, RRC also sets the state of each of them (i.e. either activated or deactivated). Subsequently, a MAC CE can be used to dynamically control whether each of the configured secondary RLC entities for a DRB should be activated or deactivated, i.e. which of the RLC entities shall be used for duplicate transmission. Primary RLC entity cannot be deactivated. When duplication is deactivated for a DRB, all secondary RLC entities associated to this DRB are deactivated. When a secondary RLC entity is deactivated, it is not re-established, the HARQ buffers are not flushed, and the transmitting PDCP entity should indicate to the secondary RLC entity to discard all duplicated PDCP PDUs.

When activating duplication for a DRB, NG-RAN should ensure that at least one serving cell is activated for each logical channel associated with an activated RLC entity of the DRB; and when the deactivation of SCells leaves no serving cells activated for a logical channel of the DRB, NG-RAN should ensure that duplication is also deactivated for the RLC entity associated with the logical channel.

When duplication is activated, the original PDCP PDU and the corresponding duplicate(s) shall not be transmitted on the same carrier. The logical channels of a DRB configured with duplication can either belong to the same MAC entity (referred to as CA duplication) or to different ones (referred to as DC duplication). CA duplication can also be configured in either or both of the MAC entities together with DC duplication when duplication over more than two legs is configured in the UE. In CA duplication, logical channel mapping restrictions are used in a MAC entity to ensure that the different logical channels of a DRB in the MAC entity are not sent on the same carrier. When CA duplication is configured for an SRB, one of the logical channels associated to the SRB is mapped to SpCell.

When CA duplication is deactivated for a DRB in a MAC entity (i.e. none or only one of RLC entities of the DRB in the MAC entity remains activated), the logical channel mapping restrictions of the logical channels of the DRB are lifted for as long as CA duplication remains deactivated for the DRB in the MAC entity.

(X)

In DC duplication, when the deactivation of the SCG leaves no serving cells activated for a logical channel of the DRB, NG-RAN should ensure that duplication is also deactivated for the RLC entity associated with the logical channel.

When an RLC entity acknowledges the transmission of a PDCP PDU, the PDCP entity shall indicate to the other RLC entity(ies) to discard it. In addition, in case of CA duplication, when an RLC entity restricted to only SCell(s) reaches the maximum number of retransmissions for a PDCP PDU, the UE informs the gNB but does not trigger RLF.

MASTER NODE, COMMUNICATION CONTROL METHOD, AND COMMUNICATION APPARATUS

CROSS-REFERENCE TO RELATED APPLICATIONS

The present application is a continuation application of international Patent Application No. PCT/JP2022/025657, filed on Jun. 28, 2022, which designated the U.S., and claims the benefit of priority of Japanese Patent Application No. 2021-107721, filed on Jun. 29, 2021, the entire contents of which are incorporated herein by reference.

TECHNICAL FIELD

The present disclosure relates to a master node, a communication control method, and a communication apparatus used in a mobile communication system.

BACKGROUND ART

Third Generation Partnership Project (3GPP) (registered trademark; the same applies hereinafter), which is a mobile communication system standardization project, dual connectivity (DC) is introduced.

In the dual connectivity, only one base station (hereinafter, it may be referred to as a "master base station" or a "master node") among a plurality of base stations establishes radio resource control (RRC) connection with a communication apparatus (user equipment (UE)). On the other hand, among the plurality of base stations, another base station other than the master base station (hereinafter, it may be referred to as a "secondary base station" or a "secondary node") does not establish the RRC connection with the communication apparatus, and provides additional radio resources to the communication apparatus.

In the dual connectivity, the communication apparatus transmits and receives user data using the radio resources of the secondary node while transmitting and receiving user data using the radio resources of the master node. As a result, the communication apparatus can improve the throughput.

On the other hand, power consumption of the communication apparatus that performs radio communication by the dual connectivity is larger than that in a case of performing the radio communication with one base station.

Therefore, in 3GPP, technology for deactivating a secondary cell group (SCG) managed by the secondary node according to a situation has been studied.

For the deactivation of the SCG, there are, for example, the following agreements in 3GPP. That is, only the master node may generate an RRC message related to activation or deactivation of the SCG, and/or the communication apparatus may indicate, to the master node, that the communication apparatus desires to deactivate the SCG.

On the other hand, in 3GPP, packet duplication is introduced. The packet duplication is technology in which a base station duplicates data (packet data convergence protocol protocal data unit (PDCP PDU)) and transmits original data and duplicated data to a communication apparatus.

The packet duplication includes a case where two pieces of data are transmitted from the same base station and a case where each piece of data is transmitted from two base stations (a master node and a secondary node). The former may be referred to as packet duplication by carrier aggregation (CA duplication), and the latter may be referred to as packet duplication by dual connectivity (DC duplication).

The communication apparatus can perform processing such as discarding data received later by using data received earlier. By the packet duplication, reliability can be improved, and latency can be reduced. Therefore, the packet duplication is effective for Ultra-Reliable and Low Latency Communications (URLLC) services.

CITATION LIST

Non Patent Literature

Non Patent Literature 1: 3GPP TS 37.340 V16.5.0
Non Patent Literature 2: 3GPP Contribution R2-2104315
Non Patent Literature 3: 3GPP Contribution R2-2103977
Non Patent Literature 4: 3GPP TS 38.300 V16.5.0

SUMMARY OF INVENTION

In the base station that performs the packet duplication by the dual connectivity, what kind of processing is performed when the SCG is deactivated is not specified in 3GPP. For this reason, in the base station, there is a case where the packet duplication is continued even when the SCG is deactivated.

Therefore, an object of the present disclosure is to provide a master node, a communication control method, and a communication apparatus capable of preventing packet duplication from being continued when an SCG is deactivated.

A master node according to a first feature is connected to a communication apparatus together with a secondary node using dual connectivity. The master node comprises a controller having a packet data convergence protocol (PDCP) entity and a first radio link control (RLC) entity, the PDCP entity outputting a PDCP protocol data unit (PDU) to the first RLC entity and outputting a duplication of the PDCP PDU to a second RLC entity of the secondary node. The PDCP entity deactivates the duplication of the PDCU PDU for the second RLC entity in a case where a secondary cell group associated with the secondary node is deactivated.

A communication control method according to a second feature, in a master node, the master node is connected to a communication apparatus together with a secondary node using dual connectivity and has a controller including a packet data convergence protocol (PDCP) entity and a first radio link control (RLC) entity. The communication control method comprises the steps of: causing the PDCP entity to output a PDCP protocol data unit (PDU) to the first RLC entity and output a duplication of the PDCP PDU to a second RLC entity of the secondary node; and causing the PDCP entity to deactivate the duplication of the PDCP PDU for the second RLC entity in a case where a secondary cell group managed by the secondary node is deactivated. A communication apparatus according to a third feature is connected to a master node and a secondary node (200-2) using dual connectivity. The communication apparatus comprises: a receiver configured to receive, from the master node, an RRC message including information for configuring a duplication of a packet data convergence protocol (PDCP) protocol data unit (PDU); and a controller configured to deactivate the duplication of the PDCP PDU in a case where a secondary cell group associated with the secondary node (200-2) is deactivated.

BRIEF DESCRIPTION OF DRAWINGS

The above and other objects, features, and advantages of the present disclosure will become more apparent from the following detailed description with reference to the accompanying drawings. The drawings are as follows.

FIG. 2 is a diagram illustrating a configuration example of a protocol stack according to the embodiment of the present disclosure.

FIG. 3 is a diagram illustrating a configuration example of a protocol stack according to the embodiment of the present disclosure.

FIG. 8 is a diagram illustrating an operation example in a specification according to the embodiment of the present disclosure.

DESCRIPTION OF EMBODIMENTS

Figure 1:
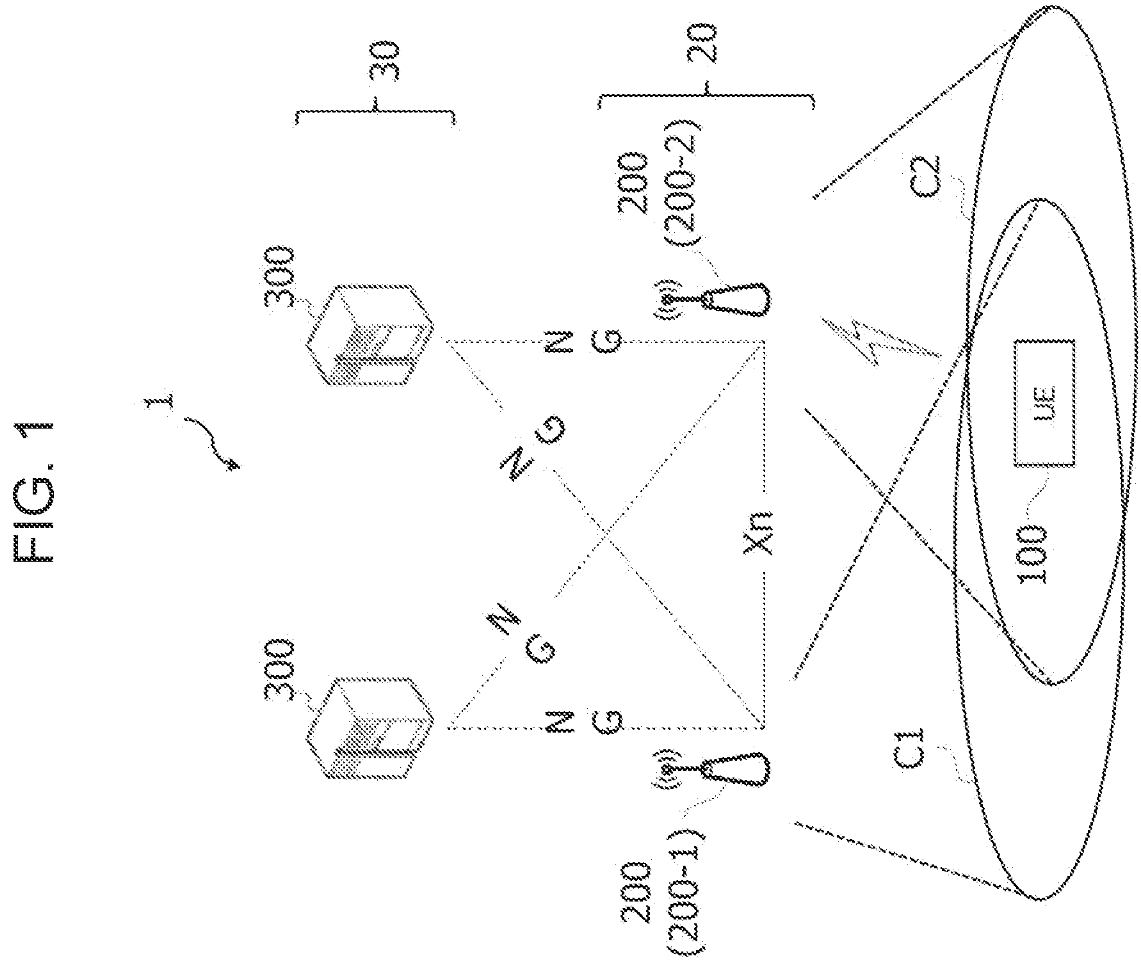
FIG. 1 is a diagram illustrating a configuration example of a mobile communication system according to an embodiment of the present disclosure.

Hereinafter, embodiments of the present disclosure will be described in detail with reference to the drawings. Note that, in the present specification and the drawings, components that can be described in a similar manner are denoted by the same or similar reference numerals, and redundant description can be omitted.

First Embodiment (1.1) Configuration Example of Mobile Communication System

FIG. 1 is a configuration example of a mobile communication system 1 according to an embodiment of the present disclosure. The mobile communication system 1 is, for example, a 5th generation (5G) system of 3GPP. Further, the mobile communication system 1 may be a system of another generation (for example, the sixth generation) after the 5G system.

As illustrated in FIG. 1, the mobile communication system 1 includes a radio access network (hereinafter, it may be referred to as a next generation radio access network (NG-RAN)) 20, a core network (hereinafter, it may be referred to as a 5G core network (5GC)) 30, and a communication apparatus (hereinafter, it may be referred to as a user equipment (UE)) 100.

The NG-RAN 20 includes a base station (gNB) 200, which is a node of a radio access network.

The base station 200 is a radio communication apparatus that performs radio communication with the UE 100. The base station 200 manages one or a plurality of cells. The base station 200 performs radio communication with the UE 100 that has established RRC connection in its cell. The base station 200 has a radio resource management function, a routing function of user data (hereinafter, it may be simply referred to as "data"), a measurement control function for mobility control and scheduling, and the like.

Note that the "cell" is used as a term indicating a minimum unit of a radio communication area. The "cell" may be used as a term representing a function of performing radio communication with the UE 100 or a term representing a resource. One cell belongs to one carrier frequency. In FIG. 1, a base station 200-1 manages a cell C1, and a base station 200-2 manages a cell C2.

The 5GC 30 includes a core network apparatus 300.

The core network apparatus 300 includes an apparatus corresponding to a control plane. In this case, the core network apparatus 300 can perform various types of mobility control on the UE 100 by communicating with the UE 100 using non-access stratum (NAS) signaling. The core network apparatus 300 may be an access management function (AMF) or a mobility management entity (MME).

Further, the core network apparatus 300 includes an apparatus corresponding to a user plane. In this case, the core network apparatus 300 performs transfer control of data of the UE 100. The core network apparatus 300 may be a user plane function (UPF) or a serving gateway (S-GW).

As illustrated in FIG. 1, each of the base stations 200-1 and 200-2 is mutually connected to the 5GC 30 via an interface called an NG interface. In addition, the base stations 200-1 and 200-2 are mutually connected via an interface called an Xn interface.

The UE 100 is, for example, a mobile radio communication apparatus such as a smartphone, a tablet terminal, a personal computer, a communication module, or a communication card. The UE 100 may be a vehicle (for example, a car, a train, or the like) or an apparatus provided in the vehicle. Further, the UE 100 may be a transport body (for example, a ship, an airplane, or the like) or an apparatus provided in the transport body. Furthermore, the UE 100 may be a sensor or an apparatus provided in the sensor. Note that the UE 100 may be used as another name such as a mobile station, a mobile terminal, a mobile apparatus, a mobile unit, a subscriber station, a subscriber terminal, a subscriber apparatus, a remote station, a remote terminal, a remote apparatus, or a remote unit.

Note that FIG. 1 illustrates an example in which the UE 100 exists in both the cell C1 managed by the base station 200-1 and the cell C2 managed by the base station 200-2.

(1.2) Configuration Example of Protocol Stack

Figure 2:
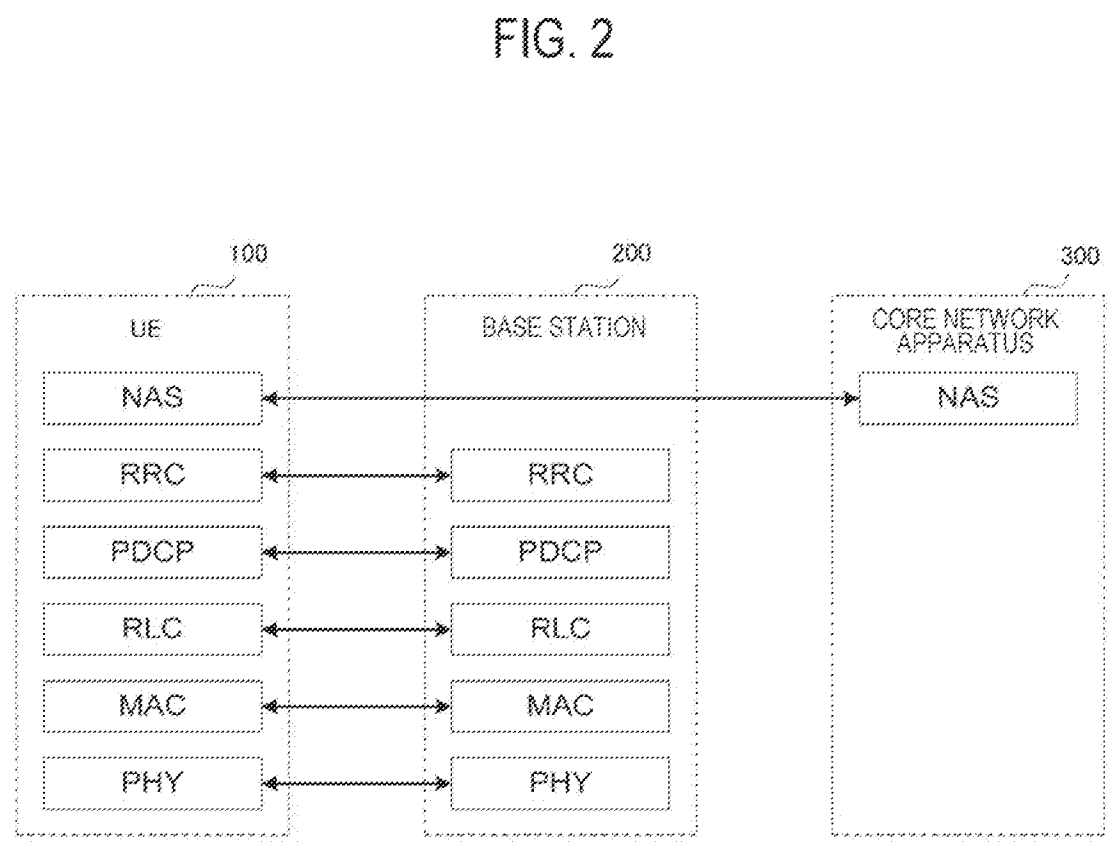

FIG. 2 is a diagram illustrating a configuration example of a protocol stack according to the embodiment of the present disclosure. FIG. 2 illustrates a configuration example of a protocol stack related to the control plane.

As illustrated in FIG. 2, a physical (PHY) layer, a media access control (MAC) layer, a radio link control (RLC) layer, a packet data convergence protocol (PDCP) layer, and an RRC layer are included in the UE 100 and the base station 200 as protocols related to the control plane. Further, an NAS layer is included in the UE 100 and the core network apparatus 300.

The PHY layer performs encoding and decoding, modulation and demodulation, antenna mapping and demapping, and resource mapping and demapping. Data and control information are transmitted between the PHY layer of the UE 100 and the PHY layer of the base station 200 via a physical channel.

The MAC layer performs priority control of data, retransmission processing by hybrid automatic repeat request (hybrid ARQ (HARM)), and a random access procedure. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size and modulation and encoding scheme) and allocated resource blocks.

The RLC layer transmits data to the RLC layer on a reception side using functions of the MAC layer and the PHY layer. Data and control information are transmitted between the RLC layer of the UE 100 and the RLC layer of the base station 200 via a logical channel.

The PDCP layer performs header compression and decompression and encryption and decryption. Data and control information are transmitted between the PDCP layer of the UE 100 and the PDCP layer of the base station 200 via a radio bearer.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. When there is RRC connection with the base station 200, the UE 100 is in an RRC connected state. When there is no RRC connection with the base station 200, the UE 100 is in an RRC idle state.

The NAS layer performs session management, mobility management, and the like. NAS signaling is transmitted between the NAS layer of the UE 100 and the NAS layer of the core network apparatus 300.

Figure 3:
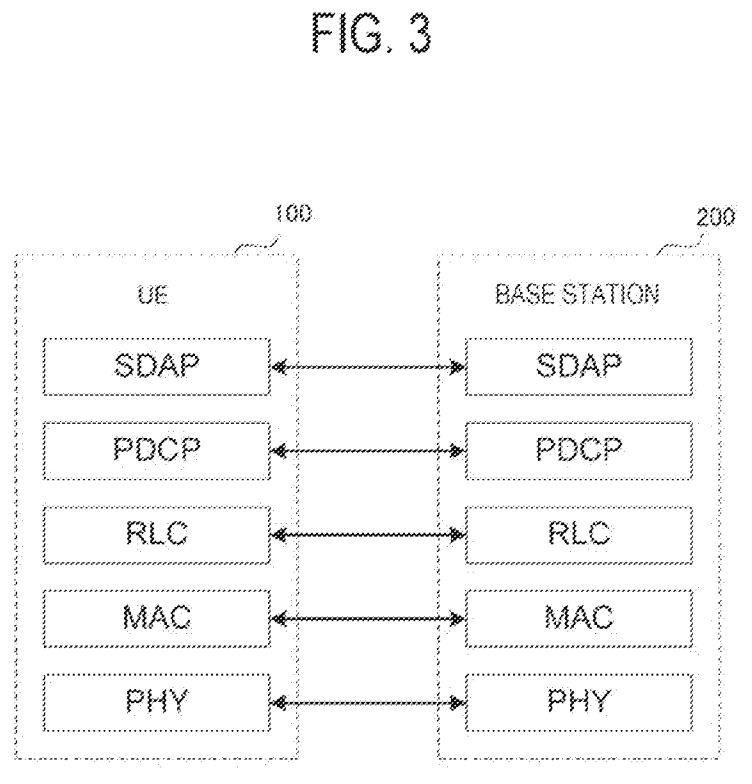

FIG. 3 is a diagram illustrating a configuration example of a protocol stack according to the embodiment of the present disclosure. FIG. 3 illustrates a configuration example of a protocol stack related to the user plane.

As illustrated in FIG. 3, a PHY layer, a MAC layer, an RLC layer, a PDCP layer, and a service data protocol (SDAP) layer are included in the UE 100 and the base station 200 as protocols related to the user plane.

The SDAP layer maps a quality of service (QoS) flow and a data radio bearer, and assigns a QoS flow identification (ID) in both uplink (UL) and downlink (DL).

(1.3) Dual Connectivity

The UE 100 can use resources provided from two different nodes connected by a non-ideal backhaul. In this case, one of the nodes becomes a master node (MN) that manages a master cell group (hereinafter, it may be referred to as the "MCG"). The other node becomes a secondary node (SN) that manages a secondary cell group (hereinafter, it may be referred to as the "SCG"). The master node and the secondary node are connected via the network interface (Xn interface). At least the master node is connected to the core network.

The master node provides a single control plane toward the core network (for example, the 5GC 30). The master node may be referred to as a master gNB.

The secondary node provides additional radio resources to the UE 100 without control plane connection to the core network. The secondary node may be referred to as a secondary gNB.

Here, the master node and the secondary node are logical entities. In the first embodiment, it is assumed that the master node corresponds to the base station 200-1, and the secondary node corresponds to the base station 200-2, in the following description.

The MCG is a cell group of a serving cell associated with the master node. The MCG has a primary cell (Sp cell or P cell) and has optionally one or more secondary cells (S cells).

The SCG is a group of serving cells associated with the secondary node. The SCG has a primary cell (Sp cell or PS cell) and has optionally one or more secondary cells (S cells). The Sp cell is a primary cell in the MCG and is also a primary cell in the SCG.

The UE 100 can be connected to the secondary node in a case of managing the SCG while being connected to the master node that manages the MCG. In this case, the UE 100 is simultaneously connected to each node to perform radio communication.

Note that the configuration of the dual connectivity is performed by the master node transmitting a predetermined message (for example, an SN Addition Request message) to the secondary node, and transmitting an RRC message (for example, an RRC Reconfiguration message) to the UE 100.

Hereinafter, the base station 200-1 may be referred to as the master node 200-1 or the master base station 200-1. Furthermore, hereinafter, the base station 200-2 may be referred to as the secondary node 200-2 or the secondary base station 200-2.

(1.4) Deactivation of SCG

Next, deactivation of the SCG will be described.

In 3GPP, the deactivation of the SCG is considered in order to suppress the power consumption of the UE 100. When the SCG is deactivated, the UE 100 deactivates all cells (PSCell and SCell) belonging to the SCG. The UE 100 does not report channel state information (CSI) for the cells belonging to the deactivated SCG, and also does not monitor a physical downlink control channel (PDCCH). Further, the UE 100 does not transmit a random access channel (RACH), a sounding reference signal (SRS), and/or a UL-shared channel (UL-SCH) to the cell. As a result, the power consumption of the UE 100 is suppressed.

The UE 100 deactivates the SCG by any one of the following methods.

Method 1: The UE 100 deactivates the SCG in response to receiving an indication to deactivate the SCG from the master node (base station 200-1). The indication is transmitted by any one of signaling of the RRC layer (RRC message), signaling of the MAC layer (MAC CE), and signaling of the PHY layer (PDCCH).

Method 2: The UE 100 deactivates the SCG in response to expiration of a timer for deactivating the SCG.

(1.5) Packet Duplication

Here, packet duplication will be described.

When the duplication is configured for the radio bearer by RRC, at least one secondary RLC entity is added to handle the duplicated PDCP PDU.

Figure 6:
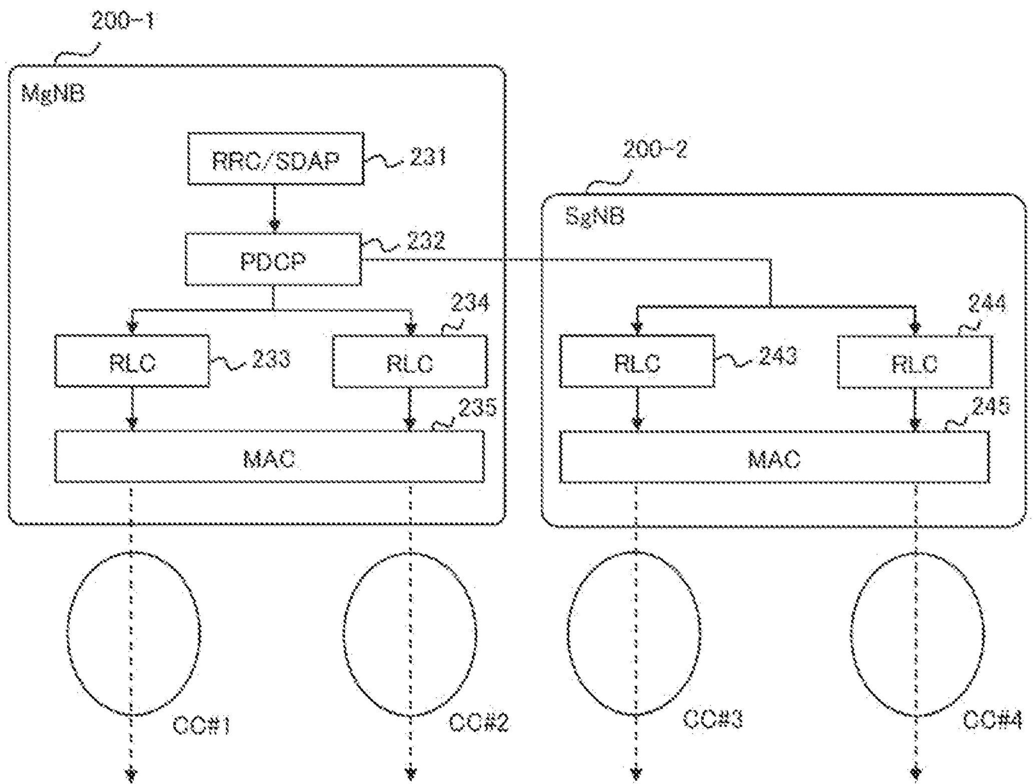
FIG. 6 is a diagram illustrating an example of packet duplication according to the embodiment of the present disclosure.

FIG. 6 is a diagram illustrating an example of packet duplication according to the embodiment of the present disclosure. Details of FIG. 6 will be described later. Here, an example of the packet duplication will be described. In FIG. 6, it is assumed that the dual connectivity is configured in the two base stations 200-1 and 200-2. The base station 200-1 is a master base station, and the base station 200-2 is a secondary base station.

In FIG. 6, for example, when an RLC entity 233 of the master base station 200-1 is a primary RLC entity, an RLC entity 234 is added as a secondary RLC entity. In addition, two RLC entities 243 and 244 of the secondary base station 200-2 are also added as secondary RLC entities.

In the packet duplication, a logical channel corresponding to the primary RLC entity 233 may be a primary logical channel, and a logical channel corresponding to each of the secondary RLC entities 234, 243, and 244 may be a secondary logical channel.

In PDCP duplication, the same PDCP PDU is output (submitted) to each of the RLC entities 233, 234, 243, and 244. Therefore, a PDCP entity 232 can output the same data (PDCP PDU) to each of the RLC entities 233, 234, 243, and 244 by packet duplication. At this time, the PDCP entity 232 may output original data to the primary RLC entity 233 and output duplicated data to the secondary RLC entities 234, 243, and 244. However, an original PDCP PDU and a duplicated PDCP PDU are not transmitted on the same carrier. FIG. 6 illustrates an example in which the original PDCP PDU is transmitted using a component carrier (CC) #1 and the duplicated PDCP PDU is transmitted using CC #2 to CC #4.

When duplication for data (or data bearer (DRB)) is configured, it is possible to dynamically control PDCP duplication. That is, each of the secondary RLC entities 234, 243, and 244 is activated or deactivated. As a result, it is possible to control which entity is the secondary RLC entity used for the transmission of the duplication. When duplication is deactivated for a data bearer, all secondary RLC entities 234, 243, and 244 associated with the data bearer are deactivated. When the secondary RLC entities 234, 243, and 244 are deactivated, the PDCP entity 232 can instruct the secondary RLC entities 234, 243, and 244 to discard all duplicated PDCP PDUs.

Note that duplication of a signaling radio bearer (SRB) for a control signal can also be configured. However, even if such a configuration is made, dynamic control cannot be performed on the duplication. Hereinafter, the duplication is described as duplication of the data (or PDCP PDU).

When duplication is activated, at least one serving cell is activated for each logical channel associated with each of the activated RLC entities 233, 234, 243, and 244. That is, at least one serving cell is activated for the primary RLC entity 233, and at least one serving cell is activated for each of the secondary RLC entities 234, 243, and 244. On the other hand, when there is no serving cell activated for the logical channel for the data bearer due to the deactivation of the secondary cell (S cell), duplication is deactivated for the RLC entities 233, 234, 243, and 244 associated with the logical channel.

When the logical channel of the data bearer configured by duplication belongs to the same MAC entities 235 and 245, it is referred to as "CA duplication". Further, when the logical channel belongs to the different MAC entities 235 and 245, it is referred to as "DC duplication". In the example of FIG. 6, since the packet duplication by the two RLC entities 233 and 234 belongs to the same MAC entity 235, the packet duplication is the CA duplication. On the other hand, since the packet duplication by the primary RLC entity 233 and the secondary RLC entities 243 and 244 belongs to the different MAC entities 235 and 245, the packet duplication is the DC duplication. The following mainly describes the DC duplication.

When the RLC entities 233, 234, 243, and 244 grasp the transmission of the PDCP PDU, the PDCP entity 232 can instruct another RLC entity to discard the PDCP PDU.

(1.6) Configuration Example of UE

Figure 4:
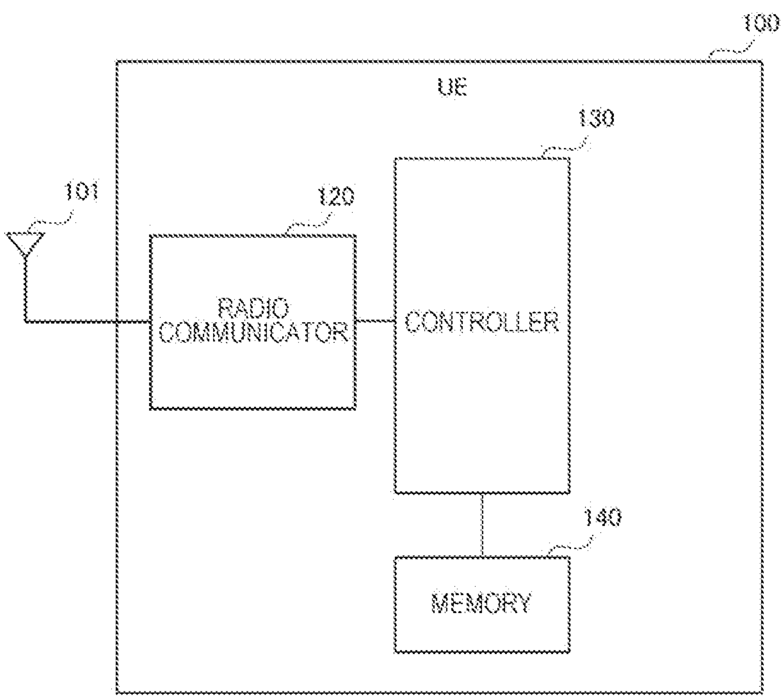
FIG. 4 is a diagram illustrating a configuration example of a UE according to the embodiment of the present disclosure.

FIG. 4 is a diagram illustrating a configuration example of the UE 100. As illustrated in FIG. 4, the UE 100 has an antenna 101, a radio communicator 120, a controller 130, and a memory 140.

The antenna 101 receives a radio signal transmitted from the base station 200 and outputs the received radio signal to the radio communicator 120. In addition, the antenna 101 transmits the radio signal output from the radio communicator 120 to the base station 200.

The radio communicator 120 performs radio communication with the base station 200 via the antenna 101 under the control of the controller 130. For example, the radio communicator 120 converts (down-converts) the radio signal output from the antenna 101 into a baseband signal (received signal), and outputs the converted baseband signal to the controller 130. Further, for example, the radio communicator 120 converts (up-converts) the baseband signal (transmission signal) output from the controller 130 into a radio signal, and outputs the converted radio signal to the antenna 101.

The controller 130 performs various types of control in the UE 100. The controller 130 controls radio communication with the base station 200 or radio communication with another UE via the radio communicator 120 or the like, for example. The controller 130 may perform various operations by processing the received signal output from the radio communicator 120. Further, the controller 130 may perform various operations and output a transmission signal to the radio communicator 120. The operation of the UE 100 to be described later may be an operation by the controller 130.

The memory 140 stores various types of information and the like under the control of the controller 130. The memory 140 may function as a working memory of the controller 130. Further, the memory 140 may store a program. In this case, the controller 130 realizes the operation in the UE 100 by reading and executing the program from the memory 140. The memory 140 may be a read only memory (ROM) or a random access memory (RAM).

(1.7) Configuration Example of Base Station

Figure 5:
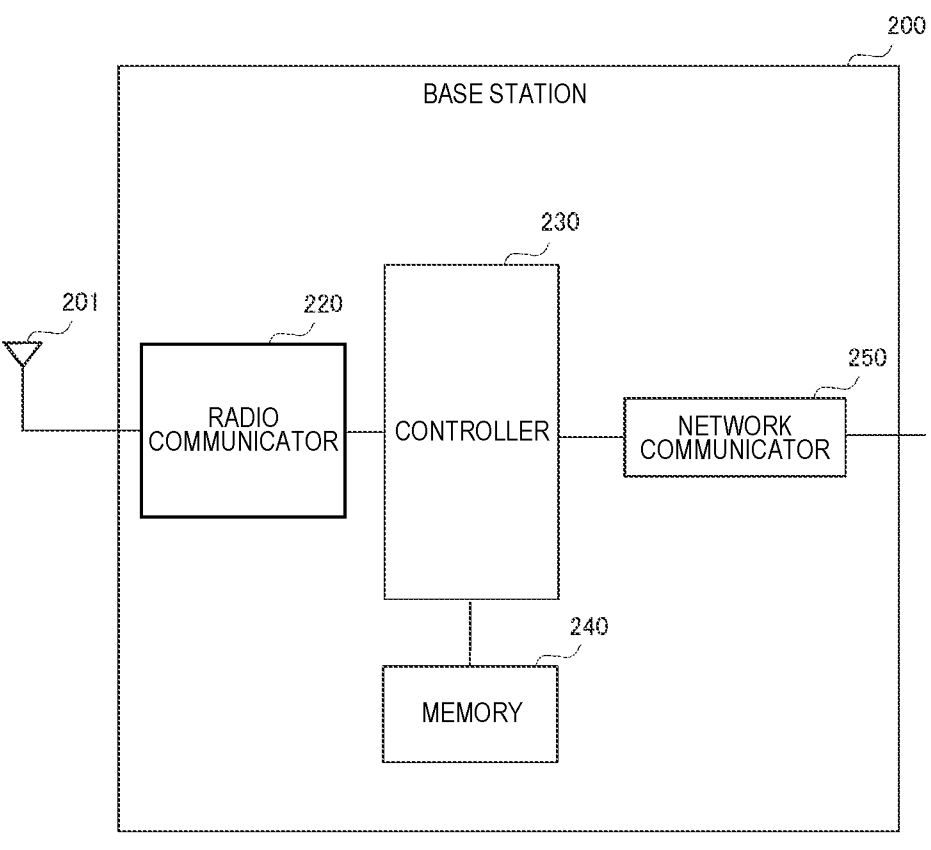
FIG. 5 is a diagram illustrating a configuration example of a base station according to the embodiment of the present disclosure.

FIG. 5 is a diagram illustrating a configuration example of the base station 200. As illustrated in FIG. 5, the base station 200 has an antenna 201, a radio communicator 220, a controller 230, a memory 240, and a network communicator 250.

The antenna 201 receives the radio signal transmitted from the UE 100 and outputs the received radio signal to the radio communicator 220. In addition, the antenna 201 transmits the radio signal output from the radio communicator 220 to the UE 100.

The radio communicator 220 performs radio communication with the UE 100 via the antenna 201 under the control of the controller 230. For example, the radio communicator 220 converts (down-converts) the radio signal output from the antenna 201 into a baseband signal (received signal), and outputs the converted baseband signal to the controller 230. Further, for example, the radio communicator 220 converts (up-converts) the baseband signal (transmission signal) output from the controller 230 into a radio signal, and outputs the converted radio signal to the antenna 201.

The controller 230 performs various types of control in the base station 200. The controller 230 controls radio communication with the UE 100 via the radio communicator 220 or the like, for example. The controller 230 may perform various operations by processing the received signal output from the radio communicator 220. Further, the controller 230 may perform various operations and output a transmission signal to the radio communicator 220.

Further, the controller 230 controls communication with the core network apparatus 300 or another base station via the network communicator 250. The controller 230 receives a message or the like transmitted from the core network apparatus 300 or another base station via the network communicator 250, and performs various operations. Further, the controller 230 can transmit various messages from the network communicator 250 to the core network apparatus 300 or another base station by performing various operations and instructing the network communicator 250 to generate and transmit messages.

The operation of the base station 200 described later may be an operation by the controller 230.

The memory 240 stores various types of information and the like under the control of the controller 230. The memory 240 may function as a working memory of the controller 230. Further, the memory 240 may store a program. In this case, the controller 230 realizes the operation in the base station 200 by reading and executing the program from the memory 240. The memory 240 may be a read only memory (ROM) or a random access memory (RAM).

The network communicator 250 can communicate with another base station. The network communicator 250 can communicate with another base station using a message of the Xn interface. Further, the network communicator 250 can communicate with the core network apparatus 300 of the 5GC 30. The network communicator 250 can communicate with the core network apparatus 300 of the 5GC 30 using a message of the NG interface.

In the mobile communication system 1 configured as described above, in the first embodiment, the master base station 200-1 has the following configuration. That is, the master base station 200-1 of the first embodiment is connected to the UE 100 together with the secondary base station 200-2 using the dual connectivity. The master base station 200-1 has the PDCP entity 232 and the first RLC entity 233. The PDCP entity 232 outputs the PDCP PDU to the first RLC entity 233 and outputs the duplicated PDCP PDU to the second RLC entities 243 and 244 of the secondary base station 200-2. Then, when the secondary cell group (SCG) managed by the secondary base station 200-2 is deactivated, the PDCP entity 232 deactivates the duplication of the PDCP PDU for the second RLC entities 243 and 244.

As a result, when the SCG is deactivated, the master base station 200-1 can also deactivate packet duplication. Details thereof will be described below.

(2) Example of Packet Duplication

FIG. 6 is a diagram illustrating an example of packet duplication. However, as described above, it is assumed that the dual connectivity is configured in the two base stations 200-1 and 200-2 and the UE 100. The master base station 200-1 manages a master cell group (MCG). In addition, the secondary base station 200-2 manages the SCG.

As illustrated in FIG. 6, the master base station 200-1 has an RRC entity 231 (or an SDAP entity 231), a PDCP entity 232, RLC entities 233 and 234, and a MAC entity 235. In addition, the secondary base station 200-2 has RLC entities 243 and 244 and a MAC entity 245.

Note that the RLC entity 233 may be referred to as a first RLC entity, and the RLC entity 243 (or the RLC entity 244) may be referred to as a second RLC entity.

In addition, it is assumed that the RLC entity 233 is configured as a primary RLC entity, and the other RLC entities 234, 243, and 244 are configured as secondary RLC entities.

As illustrated in FIG. 6, the PDCP entity 232 generates a PDCP PDU from a packet from an upper layer (SDAP layer). The PDCP entity 232 performs packet duplication. The PDCP entity 232 outputs the original PDCP PDU to the RLC entity 233 (first RLC entity). In addition, the PDCP entity 232 outputs the duplicated PDCP PDU to the RLC entity 234 and the RLC entities 243 and 244 (second RLC entities) of the secondary base station 200-2. The PDCP entity 232 may output the duplicated PDCP PDU to each of the RLC entities 233, 234, 243, and 244. The PDCP entity 232 may output (transmit) the duplicated PDCP PDU to the RLC entities 243 and 244 using the Xn interface.

Each of the RLC entities 233, 234, 243, and 244 performs segmentation processing or the like on each PDCP PDU to generate an RLC PDU. Each of the RLC entities 233, 234, 243, and 244 outputs the generated RLC PDU to the MAC entities 235 and 245.

Each of the MAC entities 235 and 245 performs padding processing and the like to generate a MAC PDU. Each of the MAC entities 235 and 245 outputs the generated MAC PDU to a PHY layer. In the PHY layer, a radio signal is generated from the MAC PDU, and the generated radio signal is transmitted to the UE 100. In the example of FIG. 6, the master base station 200-1 transmits the data output from the RLC entity 233 by using CC #1, and transmits the data output from the RLC entity 234 by using CC #2. In addition, the secondary base station 200-2 transmits the data output from the RLC entity 243 by using CC #3, and transmits the data output from the RLC entity 244 by using CC #4. The example of FIG. 6 illustrates an example in which data transmission is performed using four carriers.

(3) Operation Example

Figure 7:
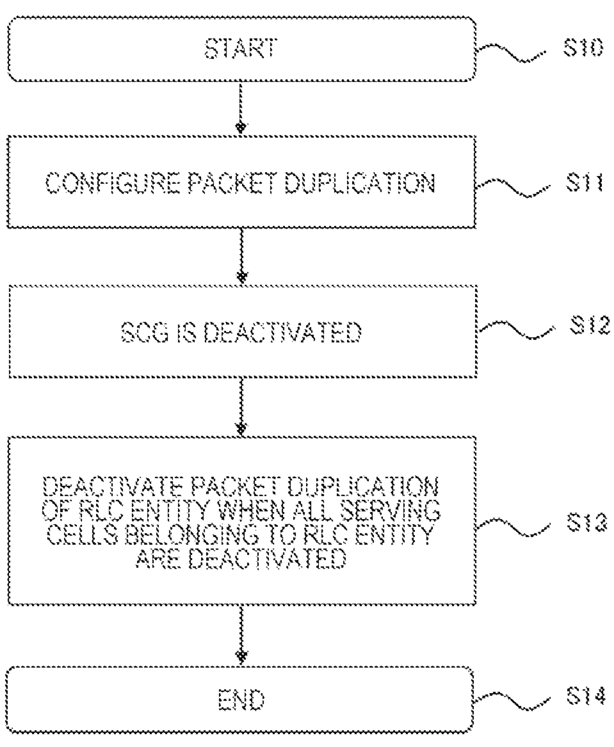
FIG. 7 is a diagram illustrating an operation example according to the embodiment of the present disclosure.

FIG. 7 is a diagram illustrating an operation example according to the embodiment of the present disclosure. It is assumed that the dual connectivity is configured in the base stations 200-1 and 200-2 and the UE 100 before processing of FIG. 7 is started. Further, each processing illustrated in FIG. 7 will be described as being performed by a network. The network in this case includes the NG-RAN 20. Therefore, for example, the master base station 200-1 may perform each processing. Further, the network may include the 5GC 30. Therefore, for example, the core network apparatus 300 may perform each processing.

In step S10, the network starts the processing.

In step S11, the network configures packet duplication. For example, the master base station 200-1 configures the packet duplication by transmitting a predetermined message (for example, a CG-Config Info message) to the secondary base station 200-2. Further, for example, the master base station 200-1 transmits a predetermined message (for example, an RRC Reconfiguration message) to the UE 100 to configure the packet duplication for the UE 100. As a result, each of the RLC entities 233, 234, 243, and 244 is activated. The RLC entity 233 becomes a primary RLC entity, and the other RLC entities 234, 243, and 244 become secondary RLC entities. Then, at least one serving cell is activated for the primary RLC entity 233, and at least one serving cell is also activated in each of the secondary RLC entities 234, 243, and 244.

In step S12, the SCG is deactivated. The network (for example, the RRC entity 231 of the master base station 200-1) may determine to deactivate the SCG. Alternatively, the network (for example, the RRC entity 231 of the master base station 200-1) may detect that the SCG is deactivated by receiving a message indicating that the SCG has been deactivated from the secondary base station 200-2. The RRC entity 231 of the master base station 200-1 outputs a notification indicating that the SCG has been deactivated to the PDCP entity 232. With this notification, the PDCP entity 232 can grasp that the SCG has been deactivated.

In step S13, when all serving cells belonging to the RLC entity are deactivated, the network deactivates the packet duplication for the RLC entity. Specifically, for each of the logical channels associated with the second RLC entities 243 and 244, the PDCP entity 232 deactivates the packet duplication for the second RLC entities 243 and 244 when a serving cell activated by the packet duplication no longer exists due to the deactivation of the SCG. As a result, the network can prevent the packet duplication from being continued.

In step S14, the network ends a series of processing.

FIG. 8 is a diagram illustrating an operation example in the specification. As illustrated in (X) of FIG. 8, in the DC duplication, when there is no serving cell activated for the logical channel of the data bearer due to the deactivation of the SCG, the network (or the NG-RAN 20) deactivates the packet duplication for the RLC entity associated with the logical channel.

(4) Modification

Figure 9:
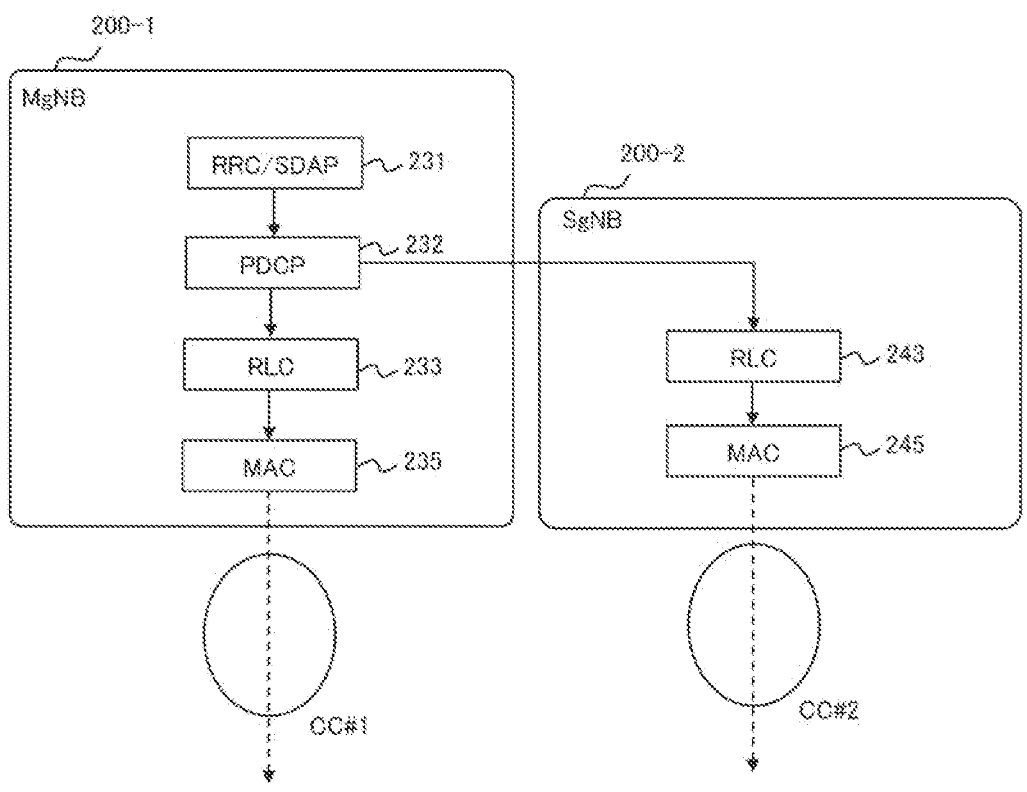
FIG. 9 is a diagram illustrating an example of packet duplication according to the embodiment of the present disclosure.

In the above-described embodiment, an example in which the duplicated packet is transmitted using four carriers has been described. For example, as illustrated in FIG. 9, a duplicated packet may be transmitted using two carriers. In the example of FIG. 9, the RLC entity 233 becomes a primary RLC entity, and the RLC entity 243 becomes a secondary RLC entity. Even in this case, the network (for example, the PDCP entity 232) deactivates the packet duplication when the SCG managed by the secondary base station 200-2 is deactivated and all the serving cells belonging to the RLC entity (for example, the secondary RLC entity 243) are deactivated. As a result, the network can prevent the packet duplication from being continued.

Other Embodiments

Each operation example described above is not limited to the case of being separately and independently performed, and each operation example can be appropriately combined and performed. Further, for example, the steps in the processing described in the present specification do not necessarily need to be executed in time series in the order described in the flowchart or the sequence diagram. For example, the steps in the processing may be executed in the order different from the order described as the flowchart or the sequence diagram, or may be executed in parallel. Also, some of the steps in the processing may be deleted, and further steps may be added to the processing.

Furthermore, for example, a method that includes the operation of one or more components of the apparatus described in the present specification may be provided, and a program for causing a computer to execute the operation of the components may be provided. The program may be recorded on a computer-readable medium. If the computer-readable medium is used, the program can be installed in the computer. Here, the computer-readable medium on which the program is recorded may be a non-transitory recording medium. The non-transitory recording medium is not particularly limited, but may be, for example, a recording medium such as a CD-ROM or a DVD-ROM. As an example of such a recording medium, there are the above-described memories 140 and 240.

Furthermore, a circuit that executes each processing to be performed by the UE 100 or the base station 200 may be integrated, and at least a part of the UE 100 or the base station 200 may be configured as a semiconductor integrated circuit (chipset or SoC).

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

The invention claimed is:

1. A master node that is connected to a communication apparatus and is connected to a secondary node using dual connectivity, the master node comprising:

a controller including a packet data convergence protocol (PDCP) entity and a first radio link control (RLC) entity, the PDCP entity outputting a PDCP protocol data unit (PDU) to the first RLC entity and outputting a duplication of the PDCP PDU to a second RLC entity of the secondary node; and a transmitter configured to transmit, to the communication apparatus, a Radio Resource Control (RRC) message including first information configuring the duplication of the PDCP PDU and second information configuring deactivation of a secondary cell group associated with the secondary node;

wherein the duplication of the PDCP PDU for the second RLC entity is deactivated in a case where the secondary cell group, including a serving cell activated for a logical channel associated with the second RLC entity, is deactivated based on the second information.

2. A communication method in a master node that is connected to a communication apparatus and is connected to a secondary node using dual connectivity, the master node including a packet data convergence protocol (PDCP) entity and a first radio link control (RLC) entity, the communication control method comprising:

causing the PDCP entity to output a PDCP protocol data unit (PDU) to the first RLC entity and output a duplication of the PDCP PDU to a second RLC entity of the secondary node; and transmitting, to the communication apparatus, a Radio Resource Control (RRC) message including first information configuring the duplication of the PDCP PDU and second information configuring deactivation of a secondary cell group associated with the secondary node;

wherein the duplication of the PDCP PDU for the second RLC entity is deactivated in a case where the secondary cell group, including a serving cell activated for a logical channel associated with the second RLC entity, is deactivated based on the second information.

3. A communication apparatus that is connected to a master node and is connected to a secondary node using dual connectivity, the communication apparatus comprising:

a controller configured to control reception of a packet data convergence protocol (PDCP) protocol data unit (PDU) and a PDCP PDU which is duplicated; and a communicator configured to receive a Radio Resource Control (RRC) message including first information configuring the duplication of the PDCP PDU and second information configuring a deactivation of a secondary cell group associated with the secondary node;

wherein the duplication of the PDCU PDU for the second RLC entity is deactivated in a case where the secondary cell group, including a serving cell activated for a logical channel associated with the second RLC entity, is deactivated based on the second information.

* * * * *